Aug. 9, 1955 J. R. GUNNING 2,715,088
METHOD OF COATING PAPER WITH THERMOPLASTIC RESINS
Filed Jan. 15, 1951
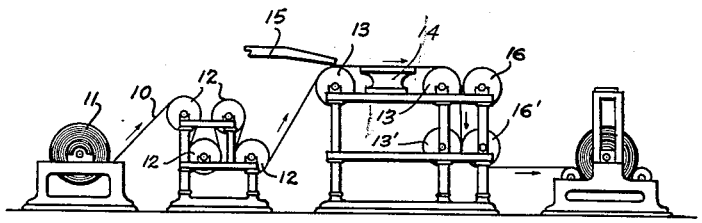
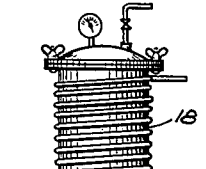
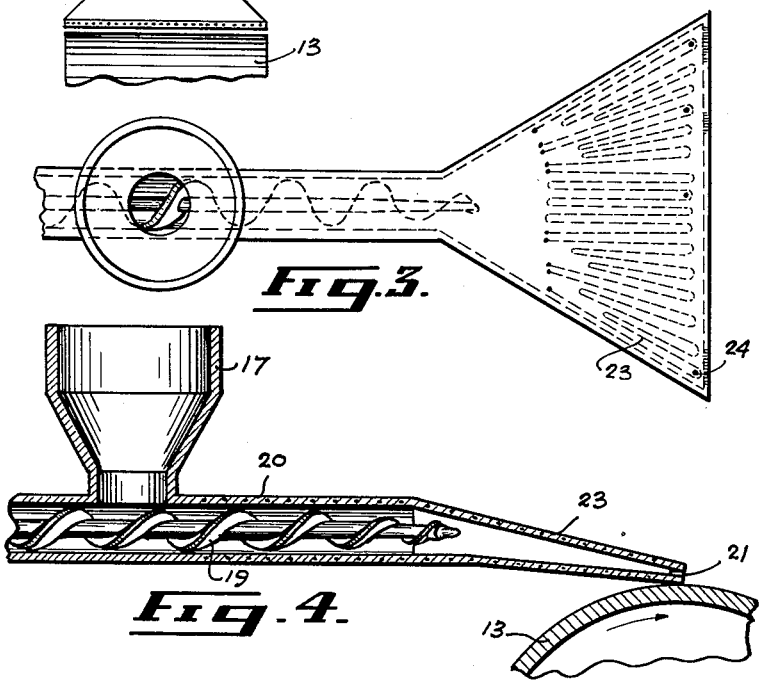
INVENTOR
JOHN R. GUNNING
BY Bailey, Stephens & Huettig
ATTORNEYS

United States Patent Office 2,715,088
Patented Aug. 9, 1955

2,715,088
METHOD OF COATING PAPER WITH THERMO-PLASTIC RESINS

John Robert Gunning, Georgetown, Ontario, Canada, assignor to Provincial Paper, Limited, Toronto, Ontario, Canada Application January 15, 1951, Serial No. 206,020
Claims priority, application Canada June 2, 1950
5 Claims. (Cl. 154—93)

This invention relates to the art of coating paper with a thermoplastic resin and is particularly directed to a method which is applicable for use with thermoplastic resins having a high softening point and which are quite viscous at temperatures above the softening point.

Thermoplastic resinous films are in common use as exterior coatings on paper. Such films contribute advantages such as a more pleasing appearance, increased waterproof qualities, decorative effects and many other advantages which are well-known to those familiar with the art. Likewise, the prior art discloses a variety of well-known methods of the application of such resins to the surface of paper. These methods involve many different techniques of applying the thermoplastic to the paper but they all involve the application of heat and pressure in some form to render the resin plastic and to form a continuous film which is bonded to the paper.

Some types of thermoplastic resins, particularly polyethylene, have an extremely high softening point which create a difficulty when attempting to produce a laminate consisting of a film of the resin and an inflammable material such as paper. This difficulty is compounded by the requirements of modern production and economic consideration which demands that processes be of the continuous nature rather than the treatment of individual batches or sheets.

The present invention is directed to a process which is useful in applying a film of thermoplastic resin to a paper but is of particular value with those resins having a high softening point and which are often viscous when softened. The paper to be coated is first preheated to as high a temperature as possible without causing damage to the paper after which the resin is extruded in the plastic state by means of suitable extrusion apparatus, onto the surface of the paper. The paper and extruded resin then passes between a pair of rolls, one roll being heated and the other one being in a cold condition. During the short travel of the paper after the extrusion of the resin has taken place, the paper and resinous coating are maintained in a heated condition. The process is well adapted to be carried out in a continuous manner in which case the paper will pass as a web over various rolls and under the extrusion nozzle and finally through calendering rolls to be rewound into a roll available for further treatment.

The accompanying drawings illustrate the apparatus used in carrying out the invention and also assist in disclosing the various steps in the process:

Figure 1 is a schematic view showing the various steps in the process;

Figure 2 is a front elevation of one means to heat the resin and the extruding die;

Figure 3 is a plan view of an alternate form of the extrusion apparatus and the die; and Figure 4 is a side elevation in section of the extrusion apparatus of the same type shown in Figure 3 showing the relationship with the paper to be coated.

The novel process will be described in general terms by reference to Figure 1. The paper to be treated is shown as a web 10 being unwound from a stock roll 11. The web then passes over a series of preheating rolls 12 which function to preheat the paper stock prior to the actual step of bonding with the thermoplastic resin.

After the paper has passed over the preheating rolls 12 it next passes over a pair of hot rolls 13 which are separated from each other by a heated table 14 upon which the web travels. The rolls 13 and table 14 should be maintained at as high a temperature as possible without scorching the paper. The temperature to which the rolls 13 and the table 14 may be heated will largely depend upon the speed of travel of the web and, with slow speeds, it has been found that a temperature of 400° F. will be suitable and with speeds in the neighbourhood of 100 F. P. M. temperatures as high or higher than 550° F. may be used.

Located just above the first heated roll is an extrusion apparatus designated generally at 15 and adapted to extrude thermoplastic resin in fine filaments upon the surface of the moving web of paper. The construction of the extrusion apparatus 15 is of a type common to the plastic extrusion art. It will be noted that the extrusion apparatus 15 is in close proximity to the web and it has been found advisable that the filament meet the sheet at an angle of about 5°. Furthermore, the front of the extrusion die is in line with the axis of the roll. The die should be located from ¼–¾ of an inch above the paper.

The web carrying the freshly deposited filaments of resin passes over the heated plate and the second heated roll. The latter roll contacts the web on the uncoated side and the coated side is under pressure from a roll 16. The roll 16 should be water cooled in order that it will be sufficiently cool to prevent any tendency to adhere to the freshly deposited filaments of resin.

It has been observed that the separate filaments of resin coalesce with each other and, under the influence of the heated rolls and the plate and also the pressure created by the action of the nip of the rolls 13 and 16, become fused into a continuous film covering the entire width of the paper.

After the coated web has passed through the rolls 13 and 16 it is rewound into a roll and is ready for further treatment or processing. If necessary, because of the deposition of a greater thickness of coating auxiliary heated and cold rolls 13' and 16' may be used.

As previously stated the extrusion apparatus 15 may be of any conventional type available to the trade. The apparatus disclosed in Figures 2 to 4 inclusive is described herein in order to illustrate the functional characteristics of apparatus of this type necessary to successfully carry out the process. Referring now to Figures 3 and 4 it will be seen that the thermoplastic resinous powder is stored in a hopper 17 which may be heated. The plastic resin is moved from the opening of the hopper 17 by a screw feeder 19 operating within a closure 20 and forced through very fine orifices 21 in the lip of the die 22. In order to maintain the resin in a plastic condition and to ensure a uniform result, it is advisable that the die 22 be heated. This may be accomplished by means of heating elements shown generally at 23. Thermocouples shown at 24 greatly assist in providing control of the temperature of the die 22 and uniformity of the plastic filaments issuing from the orifice 21.

An alternate form of the extrusion apparatus is shown in Figure 2 where the resin, in powdered form, is stored in a tank and forced under gaseous pressure into the extrusion die 22. Electrical resistance elements 18 on the exterior of the tank provide heat to change the resin from the powdered form to the plastic condition.

The width of the die 22 will depend upon the width of the web of paper being treated and the number of orifices and their size will vary with the type of thermoplastic resin being used. The lip of the die and the orifices should be in line with the axis of the first heated roller 13. The diameter of the orifices should be in the range of 0.050 to 0.020 inch. The distance between centers of the orifices will vary between 1/16 to 3/16 of an inch.

A typical example of orifice size and spacing when using polyethylene with a molecular weight of 12,000 to 13,000 would be an orifice diameter of 0.040 inch on 3/32 inch centers. The orifices should be maintained at a uniform temperature across the width of the die and a variation, in this connection, of 2° F. should not be exceeded.

The size of the filaments laid upon a sheet of paper can be governed in the following manner:

1. The speed or pressure of the extruding device;
2. The size of the orifices and their spacing in the extruder die;
3. The differential in speed between the moving web and the filament as it emerges from the die.

To reduce the thickness of the coat the web may be speeded up so as to draw the filaments into smaller cross section before they are laid on the sheet. Satisfactory sheets have been made with the filament coming from the die at 50 F. P. M. and the paper web travelling at 100 F. P. M.

The process has been found to be particularly suitable for the application of polyethylene and polyethylene containing compositions which have always been considered difficult to handle because of the high softening point of the resin. Previously, difficulty has been experienced in producing thin coatings of polyethylene upon paper.

The process can be used with polyethylene of various molecular weights and excellent results have been achieved with polyethylene varying in molecular weight from 8,000 to 19,000.

The following operating data has been obtained from practical work with polyethylene having an average molecular weight of 12,000 to 13,000, temperature of hopper end of feed hopper 350° F., temperature in conveyor housing 380° F. and temperature in the die zone and at the end of the die 400–450° F.

Instead of the conventional hopper-fed screw-feed extruding device as described above, a jacketed pressure vessel with gaseous pressure may be used as shown in Figure 2 in which case the pressure vessel should be maintained at a temperature of 450° F. the same as the die temperature.

The process has very few limitations except those of a mechanical nature. For example, the characteristics of the particular extruder used will govern the width of the extrusion die which may be used. Furthermore, a plurality of extrusion devices can be used in a side-by-side relationship with the center line of the orifice arranged in a straight line and sufficiently close to each other that they will form a continuous film on the web. As a result of tests that have been conducted, it has been found that there is no limitation on the type of paper which can be coated other than types to which a hot resin will not adhere under pressure.

The novel process described herein offers many advantages over existing techniques. As the resin is applied to the sheet in a series of parallel filaments which are reduced to a film and sealed to one another at the edges to form a continuous film on the paper, the possibility of air pockets or bubbles between the plastic film and the base stock is excluded. Furthermore, as the thermoplastic resin is being extruded as single filaments it is possible to gauge by eye the uniformity of coating by the cross section of the filaments as they meet the paper. If filaments in one section are observed to be thinner than those in another section, it follows that the coating will be thinner in this area. This is not possible with conventional film extrusion.

No attempt has been made to describe in any detail the method of constructing the various rolls and the mechanical arrangement to support the rolls and the means to operate them in order that the web will travel continuously from the unwinding to the rewinding stage. It is considered that these features are well known in the paper processing art and that a description of these details would only encumber the description of the novel process.

Although the process has been stated to be particularly applicable to the handling of polyethylene, it is to be understood that other thermoplastic resins may also be used even though no specific examples of operating conditions with such resins have been described.

Throughout the foregoing description and in the accompanying claims reference has been made to the coating of paper with a thermoplastic resin by the particular process described and claimed, but it is intended that other materials such as textiles, plastic films and other filamentary materials should be included. Consequently, the term "paper and the like" in the attached claims should be read to include such additional materials.

I claim:

1. Process of coating paper with a thermoplastic resin comprising the steps of heating the resin to a condition of plasticity, then extruding the resin in the form of a plurality of thin closely spaced parallel filaments upon the surface of the paper, fusing said filaments into a continuous film and bonding the resin to the paper under pressure.

2. Process of coating paper with a continuous film of thermoplastic resin which comprises the steps of heating the resin to produce a condition of plasticity, then extruding the plastic resin in the form of a plurality of very fine closely spaced parallel filaments upon the surface of the paper to be coated, maintaining the paper in a heated condition during the extrusion step and fusing said filaments into a continuous film by immediately subjecting the still heated paper and the resin to pressure to produce the continuous film of resin and to bond the film to the surface of the paper.

3. A continuous process of coating papers with a thin, continuous film of polyethylene which comprises the steps of preheating the paper followed by heating to a temperature in the range 400–550° F., maintaining the paper within this temperature range and applying to the surface of the paper a number of very fine closely spaced parallel filaments of polyethylene by means of extrusion, immediately subjecting the heated paper and the resin film to pressure to coalesce the individual filaments into a continuous film and binding the film to the paper.

4. A process of coating paper with a thermoplastic resin comprising the steps of heating the resin to a condition of plasticity, heating the paper, then extruding the resin in the form of a plurality of parallel filaments in a unitary plane upon the surface of the paper, the diameter of the filaments being in the range of 0.02 to 0.05 inch and the filaments being spaced apart a distance of between 1/16 and 3/16 of an inch, coalescing the individual filaments into a continuous film and simultaneously bonding the resinous film to the paper under pressure.

5. A process of coating paper with a continuous film of polyethylene having a molecular weight of 12,000 to 13,000 comprising the steps of heating the resin to a condition of plasticity, heating the paper, then extruding the resin in the form of a plurality of parallel filaments in a unitary plane upon the surface of the paper, the diameter of the filaments being about 0.04 inch and the spacing of the filaments being about 3/32 of an inch coalescing the individual filaments into a continuous film and simultaneously bonding the resinous film to the paper under presusre.

References Cited in the file of this patent

UNITED STATES PATENTS

| | | |
|---|---|---|
| 2,031,636 | Dreyfus | Feb. 25, 1936 |
| 2,070,600 | Jenett | Feb. 16, 1937 |
| 2,154,333 | Kampfer | Apr. 11, 1939 |
| 2,219,700 | Perrin | Oct. 29, 1940 |
| 2,405,977 | Peters | Aug. 20, 1946 |
| 2,473,528 | Hoover | June 21, 1949 |
| 2,539,690 | Boorn | Jan. 30, 1951 |